United States Patent
Hewlett et al.

(10) Patent No.: US 10,423,384 B2
(45) Date of Patent: Sep. 24, 2019

(54) CONTROLLER FOR INFORMATION DATA

(71) Applicant: ROLI Ltd., London (GB)

(72) Inventors: Angus Hewlett, London (GB); Rafael Szaban, London (GB); Roland Lamb, London (GB)

(73) Assignee: ROLI LTD., London (GB)

( * ) Notice: Subject to any disclaimer, the term of this patent is extended or adjusted under 35 U.S.C. 154(b) by 0 days.

(21) Appl. No.: 15/799,584

(22) Filed: Oct. 31, 2017

(65) Prior Publication Data

US 2018/0121157 A1   May 3, 2018

(30) Foreign Application Priority Data

Nov. 1, 2016 (GB) .................................. 1618448.3

(51) Int. Cl.
*G06F 3/16* (2006.01)
*G06F 3/0484* (2013.01)
*G06F 3/0488* (2013.01)

(52) U.S. Cl.
CPC .......... *G06F 3/165* (2013.01); *G06F 3/04847* (2013.01); *G06F 3/04883* (2013.01); *G06F 2203/04803* (2013.01)

(58) Field of Classification Search
CPC .. G06F 3/165; G06F 3/04847; G06F 3/04883; G06F 2203/04803
See application file for complete search history.

(56) References Cited

U.S. PATENT DOCUMENTS

| | | |
|---|---|---|
| 2011/0100198 A1 | 5/2011 | Gatzsche et al. |
| 2011/0316793 A1 | 12/2011 | Fushiki |
| 2013/0228435 A1 | 9/2013 | Whitt, III et al. |
| 2013/0239787 A1 | 9/2013 | McMillen et al. |
| 2014/0083279 A1 | 3/2014 | Little et al. |
| 2015/0046808 A1 | 2/2015 | Dejban et al. |
| 2016/0124559 A1 | 5/2016 | Linn |
| 2017/0047056 A1* | 2/2017 | Lee .......................... G06F 9/451 |

FOREIGN PATENT DOCUMENTS

WO    2016/053068 A1    4/2016

OTHER PUBLICATIONS

Search Report for British Patent Application 1618448.3, dated Apr. 26, 2017.
U.S. Appl. No. 15/799,710, Office Action dated Feb. 21, 2019, 8 pages.

* cited by examiner

*Primary Examiner* — Abhishek Sarma
(74) *Attorney, Agent, or Firm* — Merchant & Gould P.C.

(57) ABSTRACT

The present method enables controlling of information data to be processed at an output device using a touch sensitive interface, the method comprising for an electronic device identifying a first touch input at a first location of the touch sensitive interface, retrieving first information data associated with the first location, the first information data being characterized by one or more attributes defining how said information data is rendered at the output device, producing for the output device a first output signal corresponding to the first information data, while detecting that the first touch input is maintained at the first location, identifying a second touch input at a second location distinct from the first location, and; producing for the output device a second output signal corresponding to an update of the first information data using at least one attribute correlated with the second location.

18 Claims, 6 Drawing Sheets

Figure 1

Prior art

CONTROLLER FOR INFORMATION DATA

This application claims priority to British Patent Application No. 1618448.3, filed 1 Nov. 2015, which application is incorporated herein by reference. To the extent appropriate, a claim of priority is made to the above disclosed application.

TECHNICAL FIELD

The present disclosure relates to an interface for providing an input into a processor, i.e. a data processor, and can be used for numerous applications, including producing sound and music, moving a remote robotic device or instrument, or controlling a graphical user interface. More specifically, but not exclusively, it relates to interfaces which simultaneously enable multiple kinds of inputs, including those denoting discrete commands, spatial location, and pressure-level. Numerous other applications will be evident on the basis of the discussion below.

BACKGROUND FIELD

Currently, most user interfaces fall into one of two categories, which can be called "Discrete Control Interfaces (DCI)" which use a set of discrete switches which can register an on or off position to enable simple discrete inputs, and "Continuous Action Interfaces (CAI)", which register spatial, pressure-based, or gestural movement in time to enable more complex inputs based on continuous movement. DCI include keyboards, keypads, and other interfaces that use direct analog (usually switch-based) controls that usually simulate a mechanical action, while CAI include touch screens, touchpads, other two-dimensional touch sensitive interfaces using e.g. a plurality of pressure sensors, and devices like a computer mouse, which use a rolling ball or some other continuous action apparatus that allows for continuous input.

The advantages of DCI interfaces are (1) that they allow for clear discrete inputs, and (2) that they typically form a tactile input feedback system and thus do not rely on visual confirmation. In other words, they provide clear separate commands, and they give the user tactile information about which commands have registered, since the user can feel a responding pressure when he depresses a key, for example. These advantages relate not just to the kind of sensing device but also to the design of the input surface, the topmost part of the interface with which the user actually interacts. Such DCI interfaces are particularly useful for music controllers as each key provided on the interface may allow a function such as producing an audio signal corresponding to a present note. A dial provided on the same interface may further allow modulation of the audio signal properties when played, the modulation for instance altering the pitch, the frequency or characteristics of a filter or applied function.

Such controllers presenting a DCI interface with a plurality of interactive elements are usage specific, i.e. dedicated controllers. They remain costly and complex to manufacture considering the variety of different connections and mechanisms necessary to enable the different functions.

Figure 1:
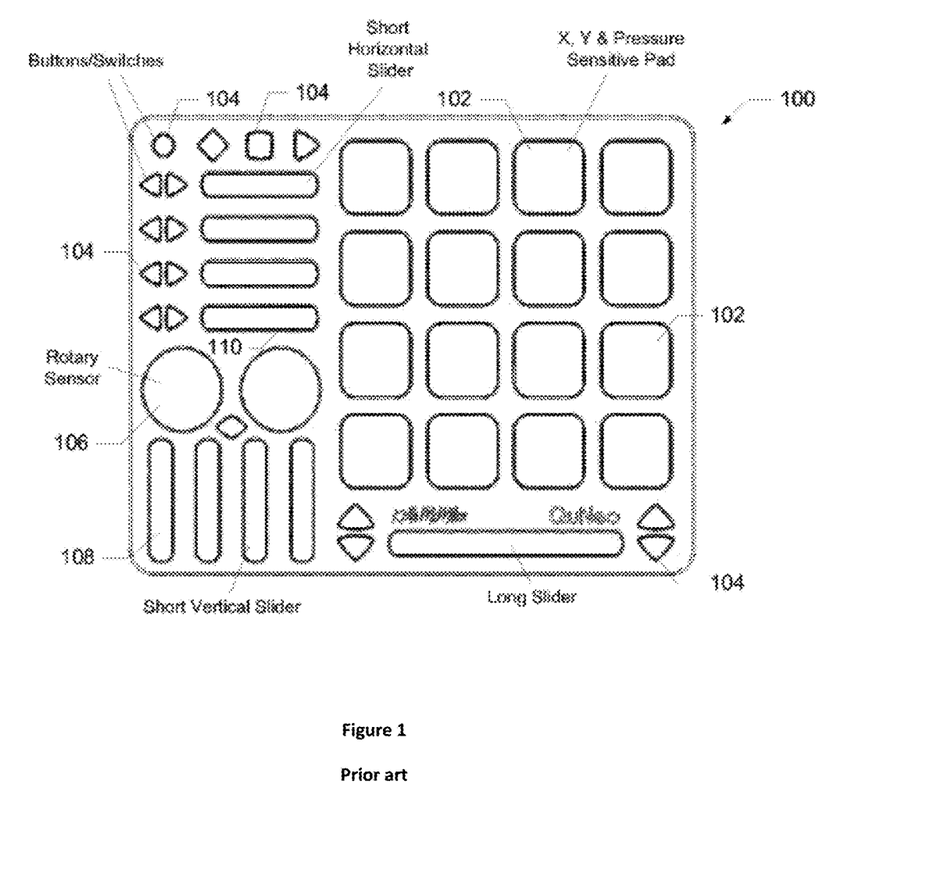
FIG. 1 is a schematic drawing of an existing DCI interface.

Document US2013239787 describes an example of a controller with a DCI interface as shown in FIG. 1. This DCI interface presents as many as four different types of interactive elements. A plurality of pressure and position sensitive pads 102 is provided to elicit audio signals such as drums or percussion sounds. Additional switches 104, rotary sensors or knobs 106 and faders 108 are also provided to modulate the audio signals resulting from a tactile input on one or more of the pads 102. A user interested in modulating a drum beat will have to manipulate different switches, knobs, dials and/or sliders to produce a modulated sound.

Beyond the complexity of manufacturing, the disadvantage of DCIs is that the user is the limited in the types of input that can be made, especially when the goal is to input quantitative or continuous information, as opposed to qualitatively separate, distinct commands.

There is still a need today for a music controller that allows complex control over an audio signal with a simple user experience to produce a variety of musical effects.

SUMMARY

An invention of the present disclosure is defined in the accompanying claims.

Broadly stated, the present method recites a method according to claim 1.

Thanks to the present method, a user has a direct control over information data associated with the first location. While the user maintains a first finger at the first location, the user can provide one or more second touch inputs, like one or more discrete touch inputs or a slide i.e. continuous touch input with another finger to produce a modulation of the attributes of the information data by correlating them to the locations of the second touch inputs. Provided the controller is connected directly or indirectly to an output device such as one or more speakers or a display, he can experience a direct feedback of the effects resulting from the second input(s) through the information data rendered on the output device. The rendering may even be multiple when the output device comprises both a display and an audio output device.

The present method may be implemented using an electronic device like a controller with a uniform interface that does not require a plurality of different interactive components, thereby ensuring ease of implementation with a non-dedicated interface. The present method is particularly suited for a music controller either comprising or operatively connected to the touch sensitive interface in order to modulate one or more property values or attributes of an audio signal. The present method may find another implementation in the control of digital objects such as graphical elements or the remote control of connected objects.

The present system also recites a device according to claim 12, a communication system according to claim 13 and a computer program claim according to claim 14.

BRIEF DESCRIPTION OF THE DRAWINGS

An arrangement will now be described in further detail, by way of example only, by reference to the accompanying drawings in which.

DETAILED DESCRIPTION

The present description, unless mentioned otherwise, will be illustrated in the context of a music controller as the electronic device enabling the control of information data such as an audio signal or audio data conveying information about one or more sounds.

Figure 2:
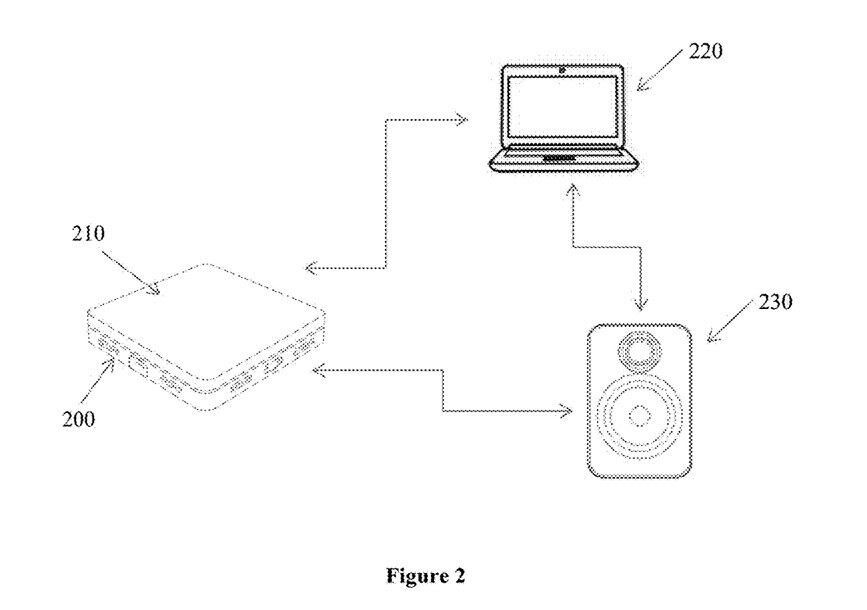
FIG. 2 is a schematic of an instance of the present system comprising a music controller and an audio output device.

FIG. 2 illustrates an instance of the present system. A music controller 200 comprising a user interface 210 is arranged to produce output signals to generate audio data or signals following a touch input applied by a user on the interface 210. The interface 210 is a touch (sensitive) interface such as a touch sensitive display. The interface 210 may alternatively comprise an array of pressure sensors distributed below the outer or user side of the interface, with or without the presence of a display. The present interface allows the capture of user touch inputs such as single touch inputs at a location, multi touch inputs using two or more fingers, or a continuous multi input like a swipe.

In the present system, the music controller 200 is configured to detect the location of a first touch input on the touch interface 210 and produce a first output or control signal corresponding to information data such as audio data associated to the detected location. The first output signal may be processed locally by the music controller 200 to render the corresponding audio data if provided with speakers. Alternatively, it may be sent to a distant output system comprising speakers 230 for rendering. The music controller may be directly connected to the output system via a wired or wireless connection, or indirectly through an electronic device 220 such as a computer or a mobile device that itself controls the audio output system.

In the present arrangement, the audio signal or data may be the digital translation of a note, a drum, a beat or more generally a sound to be rendered on an output system comprising speakers 230. The attributes characterizing the sound and defining how this sound may be rendered at an output system may be the pitch, velocity, frequency, volume, vibrato, audio panning, cues, and clock signals that set and synchronize tempo between the music controller and the distant audio output system. The output signal corresponds to the control signal generated by the music controller to drive locally or remotely the audio system, presently an audio output system, comprising the speakers 230.

The music controller 200 can be programmed in a variety of ways. One involves sending an output signal such as a MIDI signal with each new touch input, that characterizes a sound through the one or more attributes mentioned here before.

Figure 3:
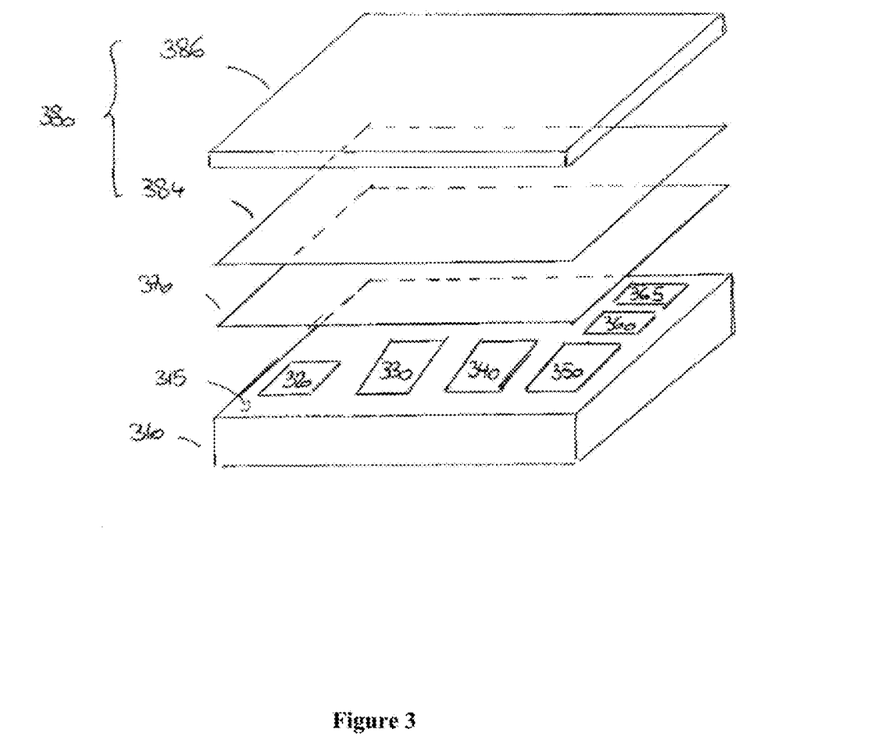
FIG. 3 is a cross sectional view of an instance of the present music controller.

FIG. 3 is a cross sectional and simplified view of an instance of the present music controller 300. The controller may comprise a housing 310 supporting a PCB 315 carrying different electronic components such as a processor 320 for executing different functions, including the operation steps of the present method, an interface controller 330 for capturing and processing the sensor data received through the touch sensitive interface, an output signal generator 340 for generating the control/output signals that are sent wirelessly using the antenna 350 to a distant audio output system. Alternatively, the signals may be sent through a wired connection using an output connector (not shown in FIG. 3). A memory 360 is provided for storing instructions to enable operations by the processor 320, including instructions to carry out arrangements of the present method. Speakers may be provided (not shown in FIG. 3) if the music controller is configured to produce or render the audio data locally using its own audio output system. A battery 365 may also be provided for powering all the controller components and ensure mobility. A base layer 370 is further provided to separate the different electronic components attached to the PCB from the interface 380, comprising a sensor array layer 384 and a cover 386.

The interface 380 may cover the entire upper surface of the housing 310 or only part of it. The interface 380 may be a known touch sensitive display capable of rendering CAIs, i.e. Graphical User Interfaces (GUIs) that may be controlled through touch inputs from the user. CAIs have the advantage of allowing for continuous input and subtle or complex forms of information to be communicated very quickly. When, for example, a touch-sensitive interface is, or is connected to, a screen with changing information, it can be used to control a huge possible set of changing variables. The visual information relayed by the GUI can communicate innumerable options and then the pointer, whether one's finger or a stylus, can move to and select a particular set of selectable graphical elements, movements and commands. In the case of a display, the interface 380 comprises a cover 386 that may be a thin glass layer while the sensor array layer 384 mounted on a screen display may use different technologies (resistive, surface acoustic wave, capacitive, infrared . . . ) for detecting a touch input from a user. Such CAIs, among other functions can report location of one or more touch inputs, including single point or continuous to the interface controller 330 that may interpret the raw sensor data into a form that processor 320 can read.

Alternatively, the interface 380 may be a pressure-sensitive interface comprising an array of pressure sensors 384. A certain degree of complexity is added in the case of pressure-sensitive interfaces compared to a CAI. A variable pressure-sensing interface can be continuous with respect to pressure in the sense that it can register a continuous flow of data about different levels of pressure, while being discrete with respect the spatial distribution of pressure sensitive areas, depending on how many pressure sensors are used and how they are arrayed. Each of the sensors of the array is pressure sensitive and can produce an output in accordance with the pressure exerted on it. The output from the various sensors is transferred to the interface controller 330. This microprocessor 330 includes algorithms that respond to certain combinations of signals from the sensors array to produce an output that the processor 320 may read. A combination of pressure applied and location resulting from the user touch input may be captured with such an interface. Indeed, location of the pressure sensors registering different levels of pressure may be registered by the interface controller 330 to infer the location of a touch input. This enables the detection of multi touch inputs as wells as continuous inputs through such pressure-sensitive interfaces.

Soft resilient material, for example silicone rubber, is provided underneath (or within) the three-dimensional top input surface 386 and indeed a surface of a layer of such soft resilient material could form the three-dimensional top surface 386. The top surface could be made, however, of any material that allowed for the diffusion of force or otherwise allowed for touch sensitivity. It could be made with a flexible OLED screen even, or a three-dimensional resistive or capacitive touch surface. In other words, the interface 380 could be a combination of a display and a pressure-sensing interface that allows the capture of user touch inputs, their location as well as the pressure exercised by the user, while adapting a GUI to the captured touch inputs. Such a combined interface may be provided for instance using an array of sensors mapping a similar array of LEDs, which all layers above the arrays presenting small perforations vertically to the LEDS. Thus a display, besides a limited resolution, is provided for visual feedback and display of a grid like in FIG. 4.

In both arrangements (display or pressure sensor array), the processor 320 may run a code that translates the output received from the interface controller 330, i.e. the basic numerical data of particular forces on particular sensors into a meaningful output. Such translation can be achieved by a variety of software solutions, again depending on the nature of the application and the desired output. The control signals may be produced directly by the processor 330 for use by the audio output system. Alternatively the processor 330 may simply report signals comprising location and/or pressure sensor readings so that the processing into control signals such as MIDI signals is done on the electronic device side (220 in FIG. 2).

The downward force is diffused through the resilient material until it reaches the other side of the material, at which point it is applied to a sensor or an array of sensors 384, which may be one-dimensional or two dimensional. In some cases, the sensors could also be arrayed onto multiple underlying surfaces and thus constitute a set of two dimensional arrays (which could in turn be described as a three-dimensional array).

Figure 4:
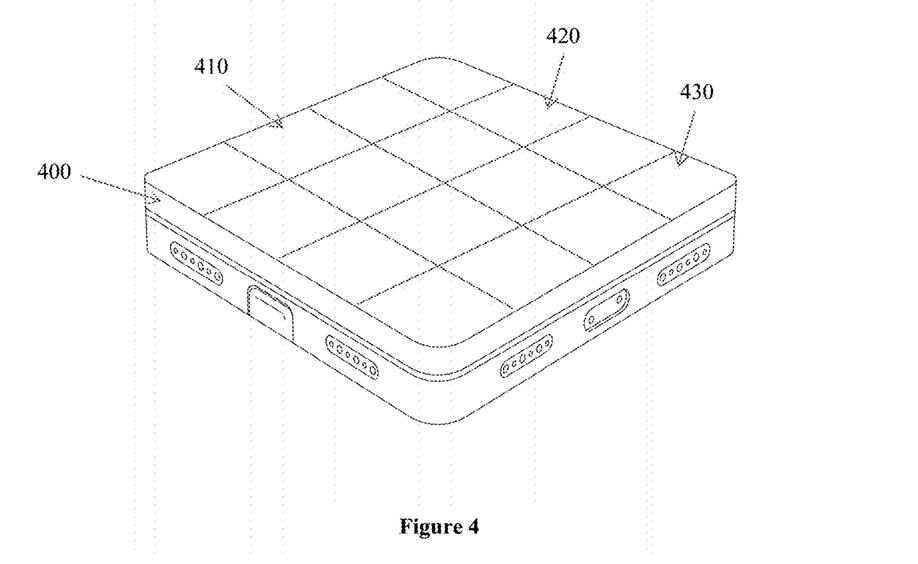
FIG. 4 is a view of one possible configuration of the interface of a music controller in accordance with the present system.

FIG. 4 is a view of one possible configuration of the interface, presently a GUI, of a music controller in accordance with the present system. In this present arrangement, the music controller comprises a display 400 for rendering the GUI of FIG. 4. The GUI comprises a plurality of different regions, here a 4×4 grid of square regions, each region like regions 410, 420, and 430 being associated to respective audio data or sound. The different regions may be rendered on the GUI using different colors or shading, or delimited using a grid like in FIG. 4. Such an interface may be used to emulate the physical pads of a music controller configured to render a sound for each pad when pressed.

One type of product where the present arrangement disclosed herein finds particular application is music controllers, partly because they produce a wide variety of different notes responsive to user inputs, and also because sound waves have a huge number of possible variables that can be modulated to create identifiably different sounds. An interface that can generate a large number of different controls over the audio data is required to give rise to the variables. The most important identifiably different sounds are associated with attributes such as rhythmic, pitch, and volume variations. Rhythmic variations require the capacity for discrete inputs, while subtle pitch variation requires continuous input. Pitch is especially important—rhythmic variation can be provided by discrete inputs in time, i.e. by providing inputs that can be distinguished in time, while in the case of pitch, one needs to be able to input discrete distinct pitches, for example to play a scale in pitch, and also to create subtle pitch variations. At the same time, every note is played at a particular volume, and minor variations in volume create the basis for important differences in the emotive quality of the music. Other attributes variables may include duration, filtering, effect (delay, distortion, echo . . . ) or any other parameters that may be used to modulate the audio data.

The problem with known music controllers like the one seen in FIG. 1 is that when there is a need for modulation of a sound associated to a pad, the user needs to use different interactive elements 102 to 108 and a two-dimensional input surface cannot provide this.

The present music controller proposes an increased control over a sound modulation without the need of any further interactive elements besides a touch interface. The present method to enable such an increased control will be now detailed in relation to flow diagram of FIG. 6 and the different touch inputs imparted on the controller touch sensitive display shown in FIGS. 5A-5D. These GUIs correspond to the GUI already described in relation to FIG. 4. This is in no way limiting as the present method may be enabled by a different type of touch sensitive interface, e.g. a pressure-sensitive interface without an associated display to provide a visual feedback to the user. Furthermore, the present arrangement will be illustrated in conjunction with the music controller producing (i.e. generating) output signals for a remote audio output system. In an alternative arrangement, the music controller may be equipped with its own the audio output system that is configured to process the output signals and render the corresponding audio data. Likewise, the interface may be part of the music controller as illustrated in the exemplary arrangement of FIG. 3. Alternatively, it may be a separate interface operatively connected, either wireless or not, to the controller. The interface then mainly reports location and pressure sensor readings if any such sensors are provided, the music controller will then detect or identify a first touch input at a first location based on the interface reports of the location. The interface may even report changes in its sensor arrays that are subsequently processed by the controller to detect location of a touch input. In other words, the touch input may be local when the touch interface is part of the controller, or remote, if distant.

Figure 5A:
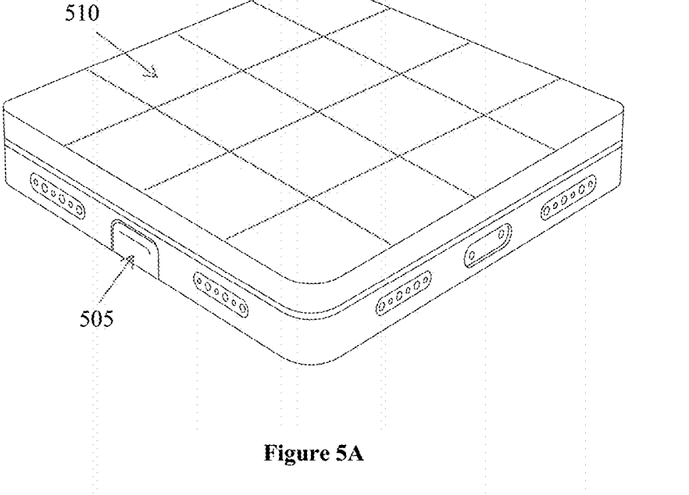
FIGS. 5A-5D are illustrations of an interface of exemplary music controller in accordance with the present system, showing different user inputs.

In a preliminary step 600 of the present method, a sound map may be defined. A sound map in the present system may associate a sound through information data such as audio data with a location of the controller interface. Each sound/audio data will be characterized by one or more attributes (pitch, volume, effect . . . ) defining how the audio data may be rendered at the output system. The definition of the sound map may be based on pre-existing sound maps or a new sound map may be generated if the user wants to modulate new sounds with the present controller. The sound map selection may be performed at the music controller using for instance a configuration button 505 provided on a side of the controller as seen in FIG. 5A, or alternatively using the electronic device in communication with the controller. Different configuration parameters such as the sound map selection, a sound map definition, choice of interface, modulation function to correlate the attributes with the location . . . may actually be remotely set using the electronic device 220 in FIG. 2 and uploaded to the music controller for implementation.

The exemplary illustration of FIG. 4 corresponds to an arrangement wherein a small number of sounds, here 16 in the 4 by 4 grid, are allocated to corresponding regions of the interface. Any touch input located within a same region will trigger the rendering of a sound associated to that region. With the display available in this arrangement, a GUI showing the 4×4 grid is also rendered as part of the selection and implementation of the sound map.

The preliminary step 600 may also comprise the connection to speakers such as speakers 230 shown in FIG. 2 and other configuration steps not related to the present method.

Subsequent steps 610 to 690 will be illustrated as carried out by the processor 320 of the music controller. In a further step 610, a first touch input is detected at a first location 510 as seen in FIG. 5A. The location is reported to the processor 320 of the music controller using the interface controller 330. A visual feedback may be provided to the user to acknowledge the first touch input. Different techniques are available to detect the capture of a touch input and are beyond the scope of the present system.

In an additional step 620 of the present method, the processor 320 will retrieve a first sound or first audio data associated to the first location. With a sound map defined by region, like illustrated in FIGS. 4 and 5A-5D, a lookup in the sound map will allow retrieving the sound associated to the region the first location belongs to. The sound map may be more refined and define sounds for regions of various sizes, and as refined as a location by location definition. The sound map may be as precise as the location detection precision itself. Alternatively some portions of the interface may be inactive based on the configuration chosen by the user.

The steps 610 and 620 may be seen as a selection of a first information data, presently in this illustration the selection of a first audio data to be rendered and modulated.

In a subsequent step 630, the processor will produce/generate, using the output signal generator, a first output signal corresponding to the first audio data. This output signal may be a MIDI signal that can be read by the electronic device 220 or directly by the audio output system 230 in FIG. 2. In an additional arrangement of the present method, the music controller may emulate a drum controller or a beat box for playing a musical rhythm. The first audio data may comprise a tempo defining the rhythm or periodicity of the note repetition and other/further attributes.

The interface of the present music controller is configured to manage and report multitouch inputs. Multitouch gestures are well known, and these allow for other kinds of particular commands to be inputted into a CAI type interface, thus providing a further hybrid experience. A "gesture" signifies a single control of an interface, which may be a pattern of contiguous touch inputs such as a sliding touch input as described here after.

As the first output signal is produced, the processor will monitor for one or more second touch inputs, e.g. a continuous touch input, at second locations distinct from the first location while detecting that the first touch input is maintained at the first location. These second touch inputs provided while the first touch input is maintained allow in the present system to control the rendering of the audio data through a modulation/correlation function of the second locations. While maintaining for instance one finger at the first location, the user can impart a modulation of the sound associated at the first location with one or more second touches such as an easy continuous motion provided on the interface.

Figure 5B:
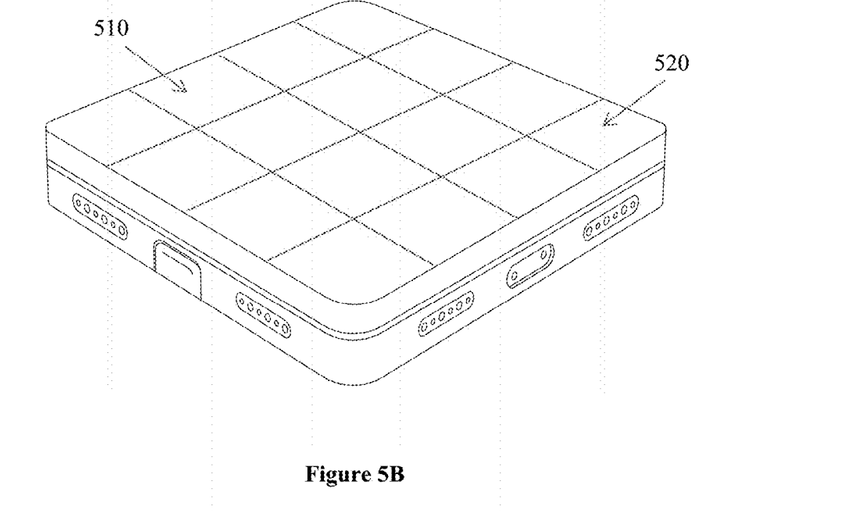
Figure 5C:
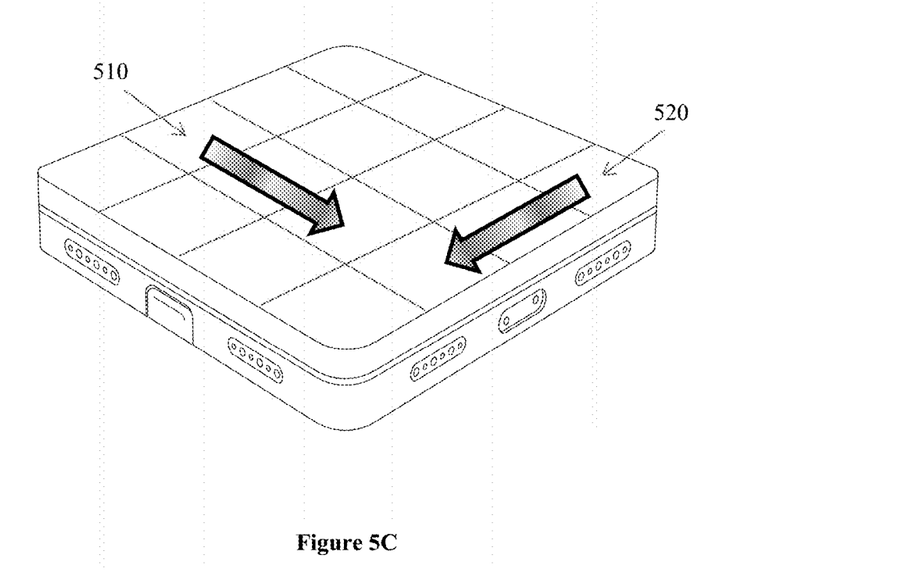
Figure 5D:
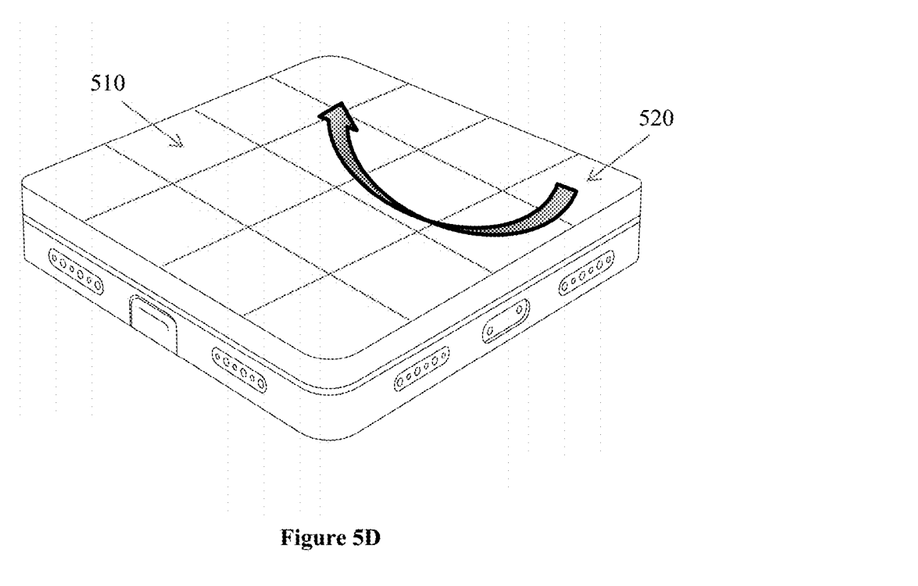

To do so, the processor 320, using messages reported from the interface controller 330, will detect a second touch input at a second location distinct from the first location in a further step 640. This is illustrated in FIGS. 5B-5D as location 520 distinct from the first location 510. Provided the first touch input was not maintained (answer No to step 650), the second touch input is considered another input similar to the first touch input for producing a sound, and the processor will retrieve in step 655, just like in step 620, second audio data associated to the second location based e.g. on the sound made. In other words, the second touch input is considered as the selection of another or second audio data. It will then produce (i.e. generate or compute) an output signal in a repeat of step 630 for rendering the retrieved audio data.

Provided the first touch input has been maintained at the first location (answer Yes to act 650), the processor will monitor for further touch input at second locations (steps 660 to 680) as seen on FIG. 5D with the arrow illustrating a sliding input sideways to the starting point 520. The second touch inputs may also be a series of discrete, i.e. distinct touch inputs. For each further second location following the previous one, the processor will produce a second output signal corresponding to an update of the first audio data using at least one first attribute correlated with the second location. The processor may be configured to process a second output signal with each further second touch input. Alternatively, it may be configured to only produce second output signals if the second touch inputs are part of a continuous touch input, such as a sliding input, comprising touch inputs at contiguous second locations. The processor will then produce second output signals with each further second location.

By each further second location, one may understand that the processor may be configured to sample the second locations reported by the interface controller 330 in case of a sliding input at a different rate so as to limit excessive computation of output signals and resulting delays. When computation is not an issue, the sampling rate of the location may be a parameter to enhance the user's experience by increasing the rate at which the second output signal is generated. The processor may be configured to discard some locations from the sliding input if the variation from the previous location is too small or only process 1 location data every N reported locations (N being an integer).

Figure 6:
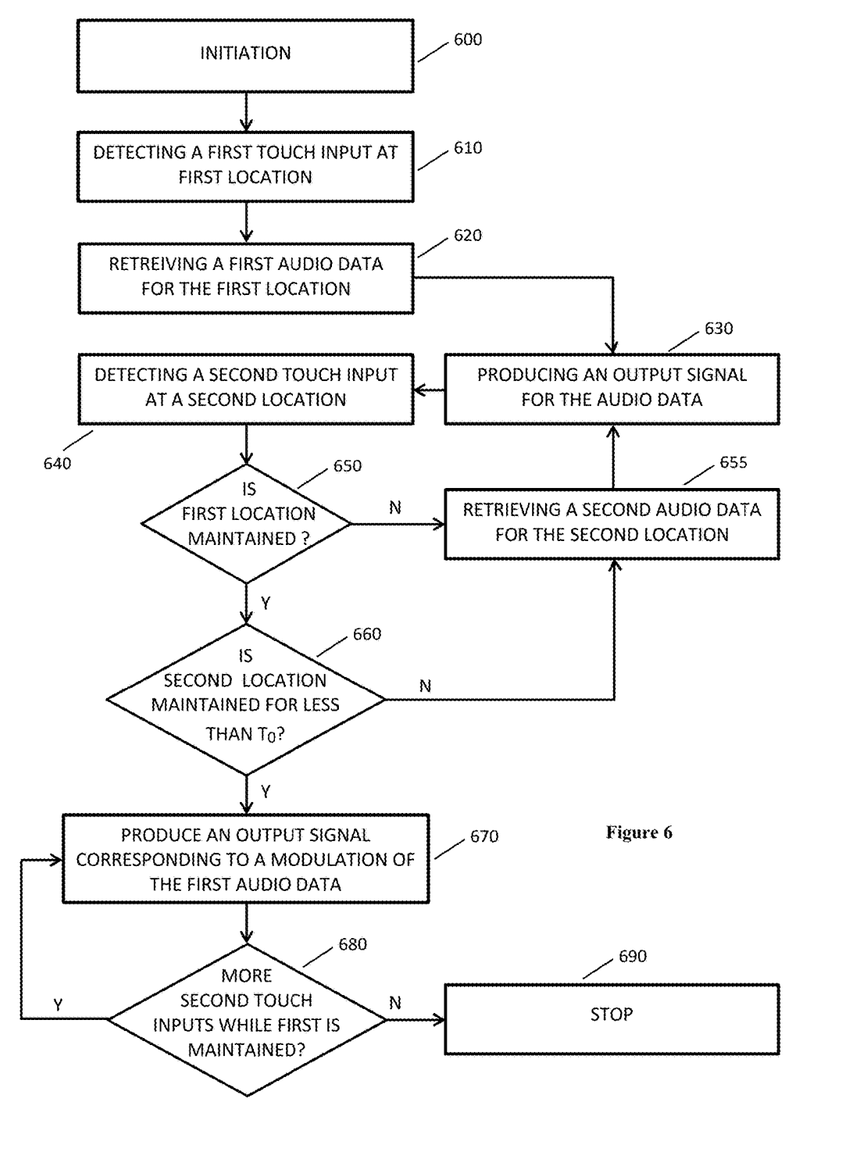
FIG. 6 is a flow diagram showing the general operational steps implemented by the present music controller.

In an additional and optional arrangement of the present method, illustrated in the flow diagram of FIG. 6, the processor will determine, while the first touch input is still maintained, how long the initial second touch input of step 640 is maintained at the initial second location 520. This will enable the music controller to branch into alternative modes. In a first mode, if the initial second location is maintained for more than a predefined threshold time T0 (answer No to step 660), using for instance what is generally known as a clutch input, the music controller will retrieve a second audio data for the initial second location in step 655 and control the rendering of the second audio data associated to the initial second location. Consequently, using the output signal generator 340, it will produce a third output signal corresponding to a second audio data associated with the initial second location in a further step 630, similarly to what the situation wherein the first location is not maintained (No to step 650). There again, second audio data is selected. In this mode nevertheless, as the first audio data for the first sound is still rendered, the user may want to play two selected sounds in synch. For instance, if the first audio data comprises first note data and a tempo in the example mentioned before, producing the third output signal will comprise using a time delay so that the first and second audio data are repeated in synch. A touch at the first location will start a first beat, and an additional (longer than T0) touch at a second location will start a second beat that is played simultaneously with the first one.

The user may even start sliding one or two fingers across the interface using slide inputs, as illustrated in FIG. 5C with the two arrows indicating a sliding motion away from the respective first and second locations 510 and 520. Further modulation may be imparted respectively to the first and second audio data with each further input respectively from the user's first and second fingers.

In an alternative second mode, if the initial second location is only maintained for less than the predefined threshold time T0 (answer Yes to step 660) before another contiguous second touch input is detected, or a release of the initial second touch input, the music controller will in a further step 670 produce an initial second output signal corresponding to a modulation of the first audio data based on initial second location. This may be achieved by combining one or more attributes of the first audio data with the initial second location. For each additional second touch input while the first one is maintained at the first location (answer Yes to step 680), a further second output signal will be produced as the processor loops with steps 670 and 680 and further second inputs are detected, like the sliding input which progresses as illustrated for instance with the arrow in FIG. 5D. Any further second touch inputs may be discrete inputs. The processor then will check each time if the touch input is shorter than the threshold time T0. When a continuous touch input is detected, the threshold time verification may be deactivated so as to avoid any disruption in the modulation of the first audio signal as the system may consider the user waived the possibility to trigger the rendering of a second audio data the moment the initial second touch input (answer Yes to step 660) was shorter than T0.

The modulation will stop in a further step 690 when no further second touch input is detected (answer No to step 680) after for instance a second time threshold T1 after the last detected second touch input. Alternatively, it may discontinue when a slide input provided as the second inputs is discontinued. This may be the consequence of the user removing his second finger to discontinue the sliding touch input.

In some arrangements as described before, the locations corresponding to the sliding input are used to modulate one or more audio properties of the first audio data. A same modulation function that correlates attributes with at least the location X, Y on the 2D interface may be used across the interface of the music controller. The modulation function may be applied for instance to the pitch, the volume, the distortion . . . . In some arrangements, the direction and/or acceleration of the slide may also be used to modulate one or more expression values beyond the simple position input.

In an additional arrangement where the interface comprises an array of pressure sensors, the modulation may be also function of the pressure sensor readings as reported for instance to the interface controller 330. In other words, the attributes of the first audio data may further be correlated using the pressure sensor readings at the second location. Depending on how the pressure sensor readings are processed, the pressure data may be for instance average around the touch input area, using all pressure sensors triggered beyond a certain value. For example, a strong force applied to the top surface of the interface will cause a relatively large number of sensors to be activated and produce output signals, as compared to a weaker force, whose effect is more narrowly transmitted by the soft resilient material of the interface to the sensors below, thereby triggering a smaller number of sensors. The same location may be reported in both instances depending on the choice of algorithm ran by the interface controller 330, limiting the impact of the variables modulated based solely on the location. For variables modulated using the pressure readings, the impact will be more noticeable. For instance, the pitch may be modulated using the pressure sensor values at the second location while the volume is modulated using the reported second location of the user sliding input. A strong input force while performing a slide will impact greatly the pitch modulation in this instance, giving the user an immediate feedback through the audio output system responsive to his sliding input.

Since the interface of the present music controller enables user controls with both discrete input (e.g. inputs at a first location to generate the notes of a chromatic scale, further discrete second touch inputs at respective second locations) and continuous inputs (e.g. the slide effects with contiguous second touch inputs), it is ideally suited for the complexity of harmonic, dynamic and rhythmic variation.

A particular example in the context of the present music controller is when the user changes in position and/or pressure with the continuous input, e.g., when the user wiggles or slides his finger back and forth. These touch inputs can be used to distort or modulate the pitch of the primary note associated at the first location to effect note bending or vibrato.

The arrangements described herein were illustrated with a music controller enabling the present method. Alternatively, the music controller 200 may be configured to solely report the touch input information (location, pressure readings if pressure sensors are provided or even lower level information such as the interface sensors readings) which is processed by the electronic device 220 in FIG. 2 for identification of the touch inputs, retrieval of the information data, modulation of its attributes, and the generation of control signals for the output device 230 as described herein. A feedback to the music controller interface 210 may then be provided by the electronic device 220 through GUI updates when a display is available and/or vibration feedback when vibrating elements are provided with the controller. In this alternative arrangement, the electronic device is the entity controlling the information data attributes and may be seen as the music controller itself while the device 200 in FIG. 2 is limited to an input device comprising the touch sensitive interface 210. The mapping between the interface locations and the sounds is then stored on the electronic device 220.

The present arrangement may be more generally seen as a communication system comprising a touch sensitive interface operatively connected to a controller for controlling information data by carrying out the present method, and generating output or control signals to an output device rendering the information data.

The present controller is not limited to interfaces corresponding to musical instruments but can be applied to many other types of interfaces, for example for controlling on a GUI an object associated to, e.g. selected through, the first touch input, and that is further moved or transformed through correlating/modulating one or more attributes using one or more second touch inputs. The attributes then may be any geometrical characteristics of the graphical objects as well as orientation, or color (e.g. pixel configuration). The second touch inputs then allow imparting variations to one or more of these attributes. When an initial second touch input is maintained for more than the time threshold T0, the controller will switch to an alternative mode, e.g. the selection of another graphical object based on the location of the initial second touch input.

The control may also be applied to smart objects such as connected objects, the attributes being parameters for an object while the control signal is a command. One example may be a GUI on a smartphone representing different connected objects in a room that may be selected through a first touch input. While a first touch input is maintained on an icon representing an object such as a camera, a video interface appears on the GUI, the user through second touch inputs at respective second locations on the GUI of the room can point the camera to these positions in the room. One important aspect of the present invention is that it can be used as an interface for programmable gestures. In other words, a user could activate a setting on the processor to record a gesture and then touch the interface in a particular, unique way, and then instruct the processor that when that gesture is performed on the input surface the processor will activate a given command. This would allow individuals, and software programmers, a wide variety of options to play with, and a given interface could be tailored in software to precisely fit the needs of a given user. As mentioned above, this might have particular applications for the disabled, as well as for a broader market.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. The computer readable medium may be transitory or non-transitory. The computer readable medium could be, for example, an electronic, magnetic, optical, electromagnetic, infrared, or semiconductor system, or a propagation medium for data transmission, for example for downloading the code over the Internet. Alternatively, the computer readable medium could take the form of a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

An apparatus such as a computer may be configured in accordance with such code to perform one or more processes in accordance with the various methods discussed herein. Such an apparatus may take the form of a data processing system. Such a data processing system may be a distributed system. For example, such a data processing system may be distributed across a network.

The term "gestures" signifies a pattern of touching or pressing the input surface with the user's fingers or hand, including a pattern of moving the fingers or hand over the input surface. Thus gestures can include using the fingers to pinch, slide or swipe or vary pressure in a particular way. A pinch may be seen by the present controller as a double slide gesture of two fingers coming together and could enable in the present system further modulation through the respective slides.

The invention claimed is:

1. A method for controlling information data to be processed at an output device using a touch sensitive interface, the method comprising for an electronic device:
   identifying a first touch input at a first location of the touch sensitive interface;
   retrieving first information data associated with the first location, the first information data being characterized by one or more attributes defining how said first information data is rendered at the output device;
   producing for the output device a first output signal corresponding to the first information data;
   while detecting that the first touch input is maintained at the first location, identifying a second touch input at a second location distinct from the first location; and
   producing for the output device a second output signal corresponding to an update of the first information data using at least one attribute correlated with the second location,
   wherein identifying a continuous touch input comprises, when an initial second location is maintained for more than a predetermined threshold time, producing a third output signal corresponding to second information data associated with the initial second location,
   wherein the first information data is a first note, the second information data is a second note and the second note is produced in synchronisation with the first note, and
   wherein the touch sensitive interface comprises pressure sensors and wherein inputs to the touch sensitive interface are identified by detecting a compression of at least part of the touch sensitive interface.

2. The method of claim 1, wherein identifying a second touch input further comprises:
   identifying a continuous touch input comprising contiguous second touch inputs at respective second locations distinct from the first location,
   a second output signal being produced with each further detected second touch input.

3. The method of claim 2, wherein identifying a continuous touch input further comprises an initial step of producing an initial second output signal for an initial second touch input of the continuous touch input when a corresponding initial second location is maintained for less than a predetermined threshold time before a further second touch input is detected.

4. The method of claim 1, wherein the information data is audio data conveying sound information.

5. The method of claim 1, wherein the first information data corresponds to a first note and comprises a tempo for periodically repeating the first note and further attributes, and wherein producing the second output signal comprises correlating only one or more of the further attributes with the second location.

6. The method of claim 3, wherein the second information data corresponds to a second note, wherein producing of a third output signal further comprises using a time delay so that the first and second notes are repeated in synch.

7. The method of claim 1, wherein the at least one attribute is further correlated with pressure sensors readings at the second location.

8. The method of claim 5, wherein the tempo is function of pressure sensors readings at the first location.

9. The method of claim 1, wherein the touch sensitive interface further comprises a display, the method further comprising a preliminary step of:
   displaying a graphical user interface on the display comprising a plurality of different regions, each region being associated with an audio data,
   retrieved first audio data being associated with the region the first location belongs to.

10. The method of claim 1, wherein the touch sensitive interface is a touch display interface and the information data is a graphical object displayed on the touch display interface at the first location of the first touch input.

11. The method of claim 10, wherein the graphical object is a virtual representation of the output device, the one or more attributes being attributes to control the output device, an output signal being a command to control the output device.

12. A non-transitory computer readable medium comprising computer readable instructions which, when executed by a computer processor, cause the computer processor to perform the method of claim 1.

13. The method of claim 1, wherein a surface of the touch sensitive interface is formed of a soft resilient material.

14. The method of claim 13, wherein the soft resilient material comprises silicon rubber.

15. The method of claim 1, wherein the pressure sensors are arranged in a three-dimensional array.

16. The method of claim 1, further comprising reproducing the first and second notes in synchronization.

17. An electronic device for controlling information data to be processed at an output device using a touch sensitive interface, the electronic device comprising a processor arranged to:
  identify a first touch input at a first location of the touch sensitive interface;
  retrieve first information data associated with the first location, the first information data being characterized by one or more attributes defining how said first information data is rendered at the output device;
  produce for the output device a first output signal corresponding to the first information data;
  while detecting that the first touch input is maintained at the first location, identify a second touch input at a second location distinct from the first location,
  produce for the output device a second output signal corresponding to an update of the first information data using at least one attribute correlated with the second location,
  wherein identifying a continuous touch input comprises, when an initial second location is maintained for more than a predetermined threshold time, producing a third output signal corresponding to second information data associated with the initial second location,
    wherein the first information data is a first note, the second information data is a second note and the second note is produced in synchronisation with the first note, and
    wherein the touch sensitive interface comprises pressure sensors and wherein inputs to the touch sensitive interface are identified by detecting a compression of at least part of the touch sensitive interface.

18. A communication system for controlling information data and comprising:
  an output device for processing the information data;
  a touch sensitive interface for capturing touch inputs and
  an electronic device comprising a processor arranged to perform:
    identifying a first touch input at a first location of the touch sensitive interface,
    retrieving first information data associated with the first location, the first information data being characterized by one or more attributes defining how said first information data is rendered at the output device,
    producing for the output device a first output signal corresponding to the first information data,
    while detecting that the first touch input is maintained at the first location, identifying a second touch input at a second location distinct from the first location, and
    producing for the output device a second output signal corresponding to an update of the first information data using at least one attribute correlated with the second location,
    wherein identifying a continuous touch input further comprises, when an initial second location is maintained for more than a predetermined threshold time, producing a third output signal corresponding to second information data associated with the initial second location,
    wherein the first information data is a first note, the second information data is a second note and the second note is produced in synchronisation with the first note, and
    wherein the touch sensitive interface comprises pressure sensors and wherein inputs to the touch sensitive interface are identified by detecting a compression of at least part of the touch sensitive interface.

* * * * *